(12) United States Patent
Iijima et al.

(10) Patent No.: US 6,800,983 B1
(45) Date of Patent: Oct. 5, 2004

(54) MAGNETIC CIRCUIT STRUCTURE, AND POWER-GENERATING DEVICE AND ELECTRONIC DEVICE USING THE SAME

(75) Inventors: Yoshitaka Iijima, Shiojiri (JP); Kinya Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/647,973

(22) PCT Filed: Feb. 4, 2000

(86) PCT No.: PCT/JP00/00633
§ 371 (c)(1),
(2), (4) Date: Oct. 4, 2000

(87) PCT Pub. No.: WO00/46898
PCT Pub. Date: Aug. 10, 2000

(30) Foreign Application Priority Data

Feb. 5, 1999 (JP) .......................................... 11-028671

(51) Int. Cl.[7] .............................. H02K 1/12; H02K 1/06
(52) U.S. Cl. ....................... 310/254; 310/217; 335/281; 335/296; 335/297; 335/298; 336/210; 336/216; 336/217; 336/234
(58) Field of Search ................................ 335/281, 296, 335/297, 298; 336/210, 216, 217, 234; 310/216, 217, 254

(56) References Cited

U.S. PATENT DOCUMENTS

| | | | |
|---|---|---|---|
| 2,456,461 A | * 12/1948 | Dunn ........................... 336/215 |
| 3,210,708 A | * 10/1965 | Franklin et al. ............. 336/217 |
| 3,502,922 A | 3/1970 | Oscar |
| 3,693,035 A | * 9/1972 | Ostwald ....................... 310/51 |
| 4,370,578 A | 1/1983 | Tilse |
| 4,614,888 A | * 9/1986 | Mosher et al. ............... 310/261 |
| 4,713,565 A | 12/1987 | Grosjean .................. 310/49 R |
| 4,720,649 A | 1/1988 | Habermann et al. ........ 310/90.5 |
| 5,289,064 A | 2/1994 | Sakamoto .................. 310/49 R |
| 5,780,951 A | * 7/1998 | Stephens ..................... 310/172 |
| 5,834,866 A | 11/1998 | Fujitani et al. ............ 310/49 R |
| 5,847,903 A | 12/1998 | Ogawa et al. ............... 360/106 |

FOREIGN PATENT DOCUMENTS

| | | | |
|---|---|---|---|
| EP | 0 668 653 B1 | * | 8/1995 |
| EP | 0 777 314 A2 | | 6/1997 |
| GB | 180104 | | 5/1922 |
| JP | 46-113478 | * | 8/1973 |
| JP | 52-34902 | * | 3/1977 |
| JP | 52-161410 | * | 12/1977 |
| JP | 53-807 | * | 1/1978 |
| JP | 53-4216 | * | 1/1978 |
| JP | 54-56114 | | 5/1979 |
| JP | 57-95044 | * | 6/1982 |
| JP | 58-134049 | * | 9/1983 |
| JP | 60-255220 | * | 12/1985 |
| JP | 61-502721 | | 11/1986 |
| JP | 63-114551 | | 5/1988 |
| JP | 3-94049 | * | 9/1991 |
| JP | 7-231592 | * | 8/1995 |
| JP | 10-42532 | * | 2/1998 |
| WO | WO 86/00765 | | 1/1986 |

* cited by examiner

*Primary Examiner*—Ramon M. Barrera
(74) *Attorney, Agent, or Firm*—Rosalio Haro

(57) ABSTRACT

Opposing concave structures formed in an end portion 22b of a stator yoke 22 and an end portion 23b of a magnetic core 23 are mated in a staggered manner and are joined. An upper projecting portion 22b-1 of the stator yoke 22 is fitted in a recessed portion formed on a lower projecting portion 23b-2 of the magnetic core 23, and the lower projecting portion 23b-2 of the magnetic core 23 is fitted in a recessed portion formed under the upper projecting portion 22b-1 of the stator yoke 22. In this state, the stator yoke 22 and the magnetic core 23 are fixedly fastened by a joint screw 24 and a tube 26. This structure makes it possible to reduce magnetic resistance in a magnetic circuit structure and to improve power-generating efficiency of a power-generating device using the structure.

28 Claims, 9 Drawing Sheets

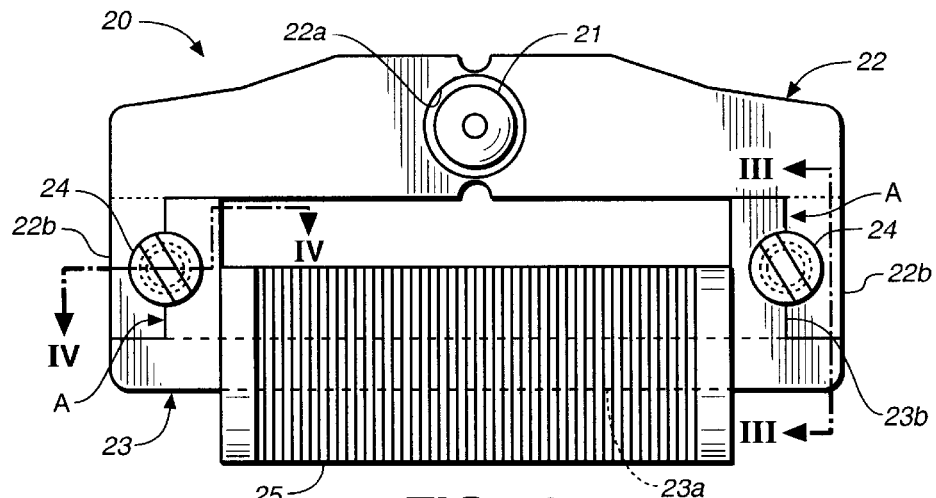
FIG._1
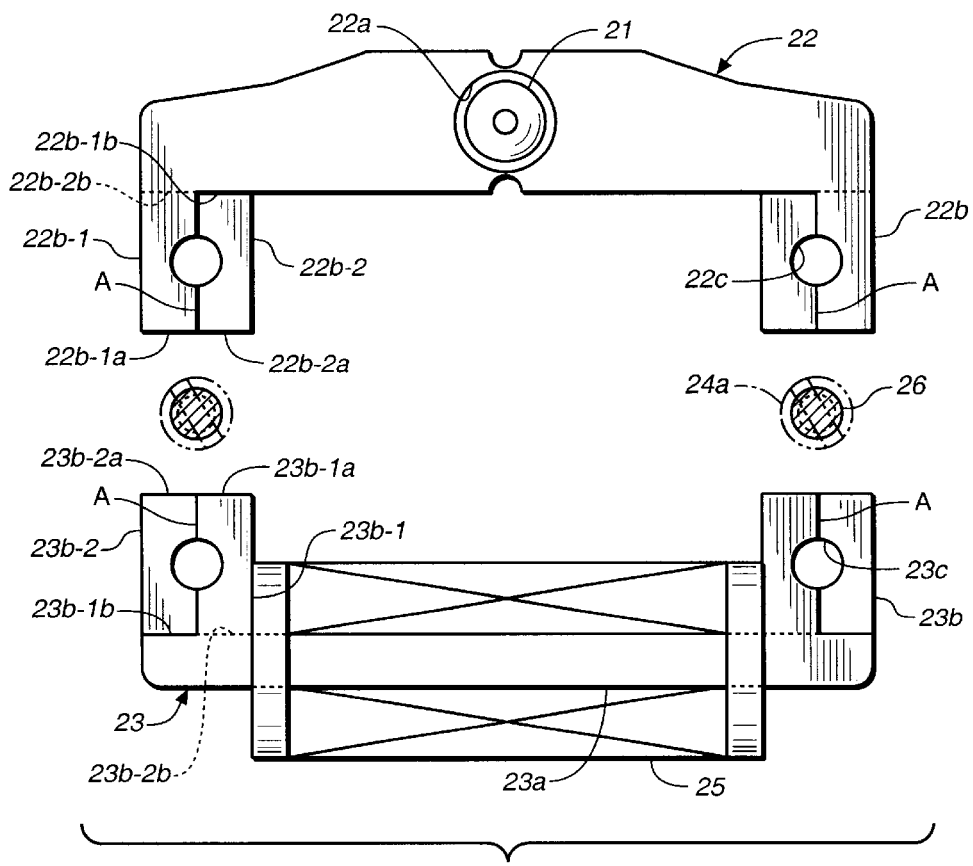
FIG._2

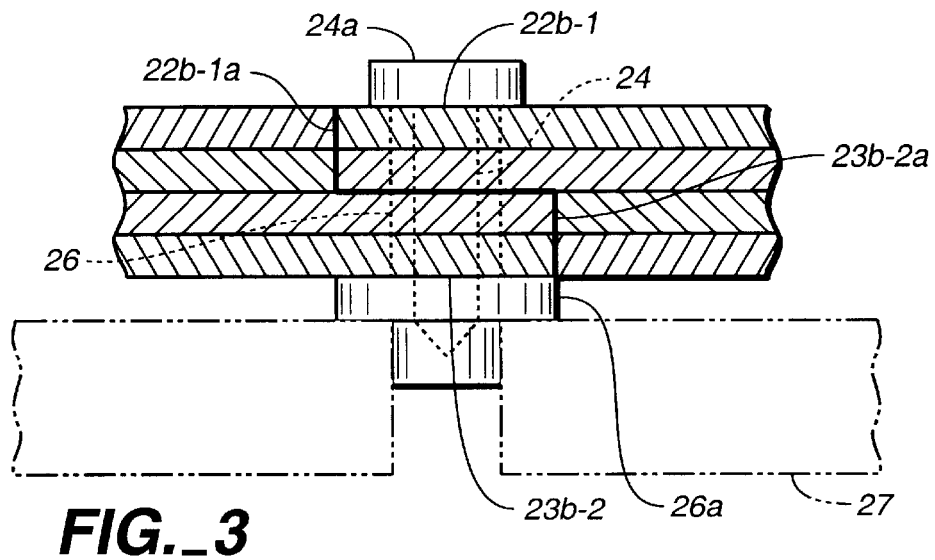
FIG._3
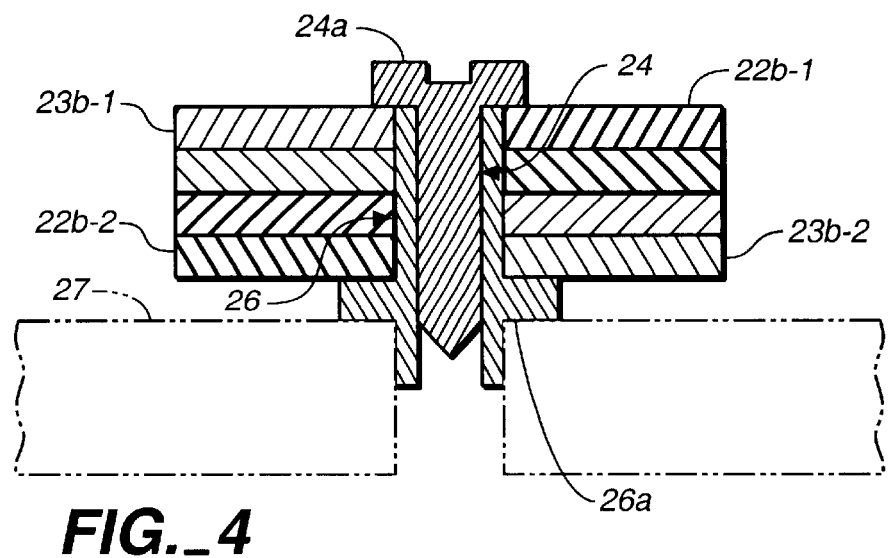
FIG._4

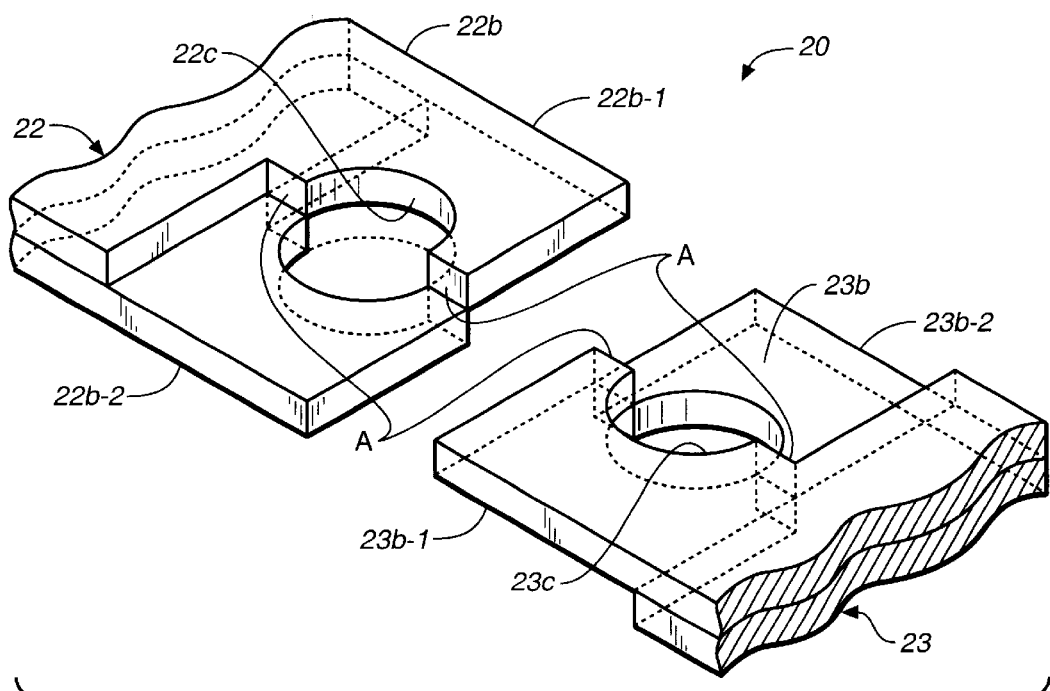
FIG._5
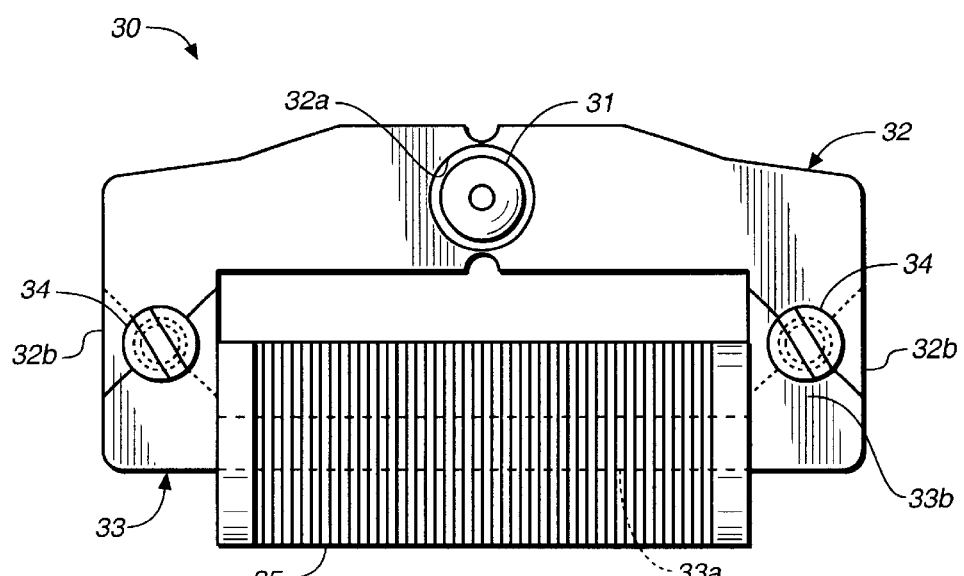
FIG._6

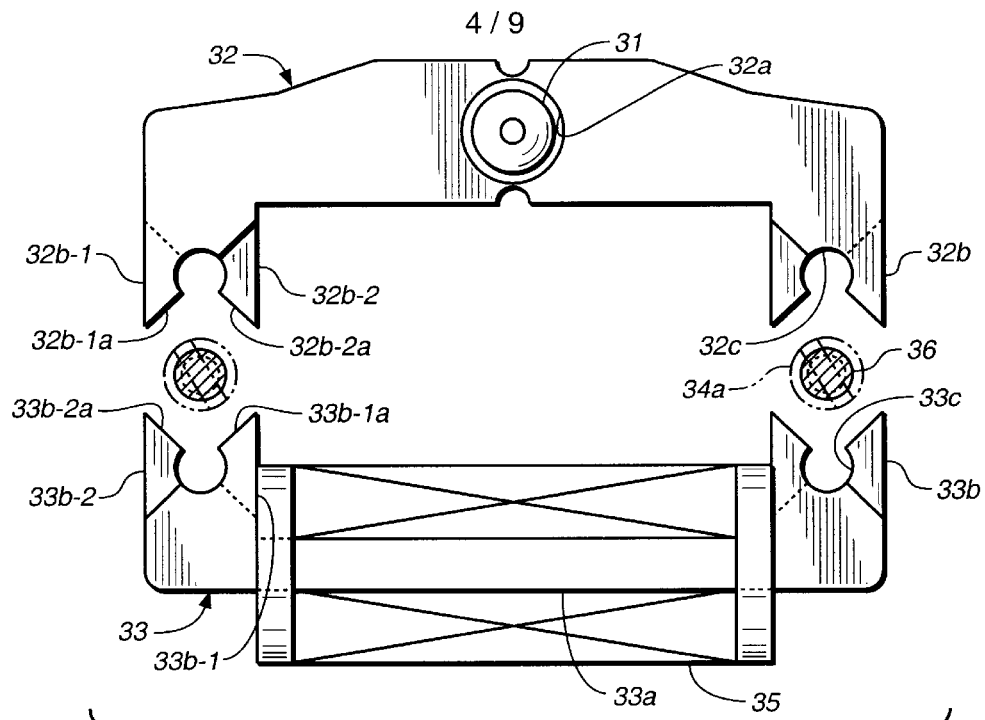
FIG._7
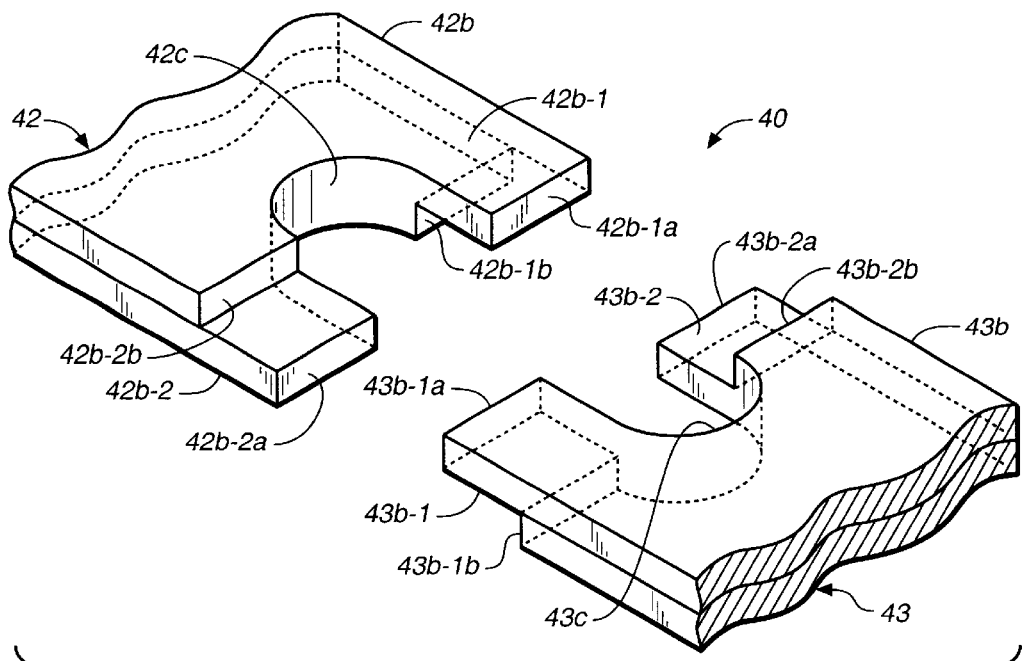
FIG._8

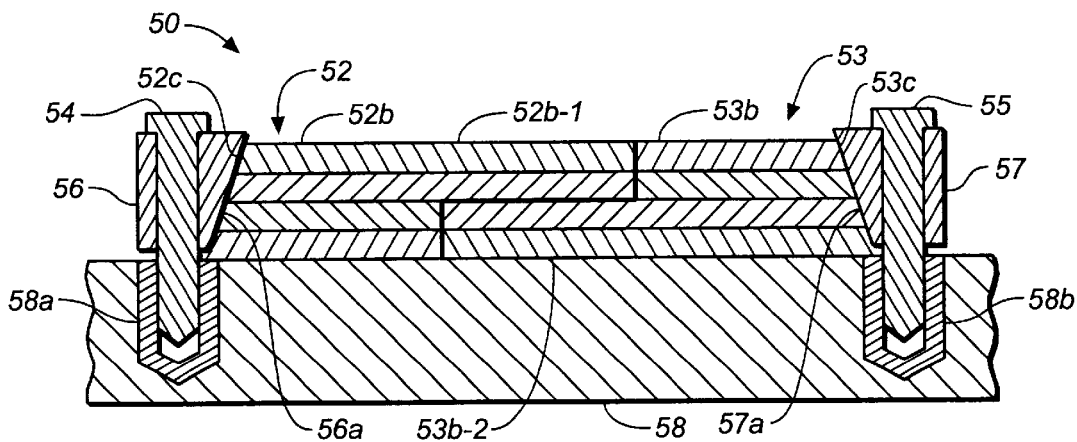
FIG._9
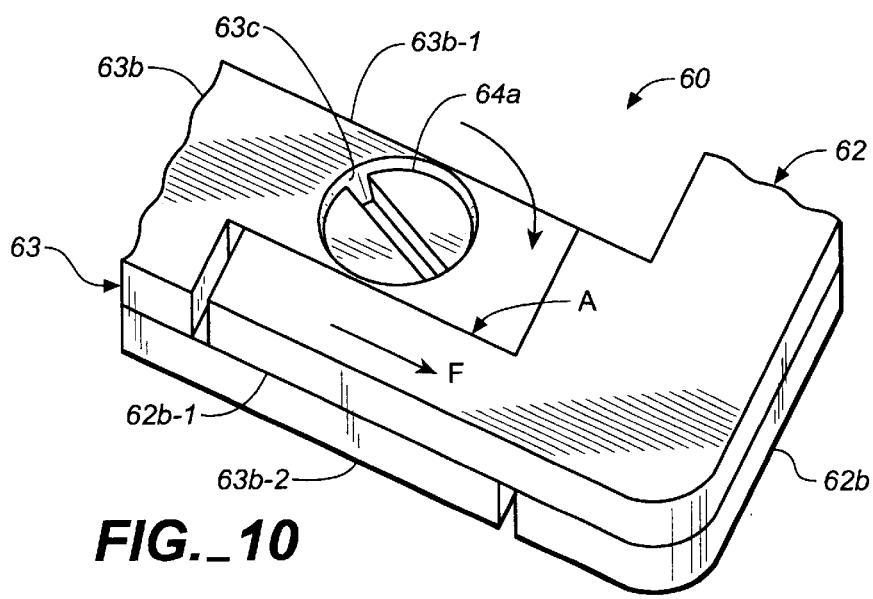
FIG._10
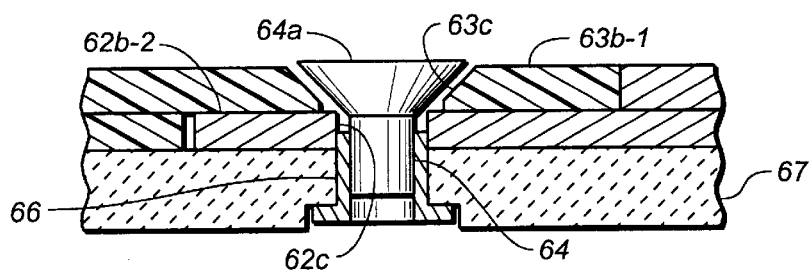
FIG._11

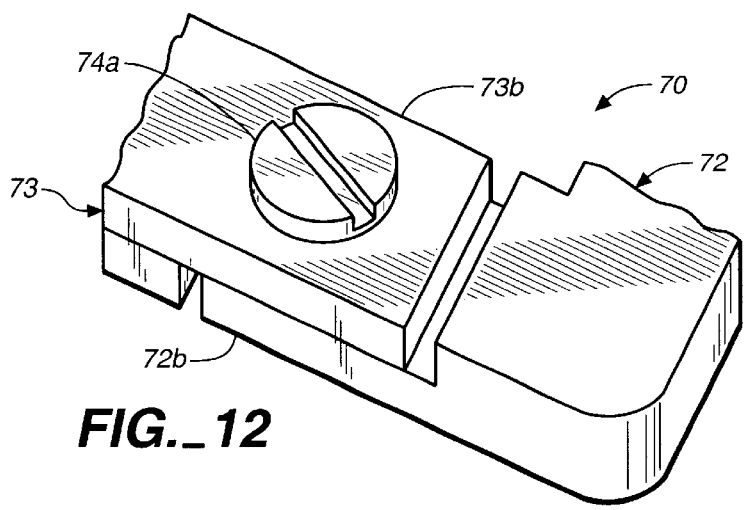
FIG._12
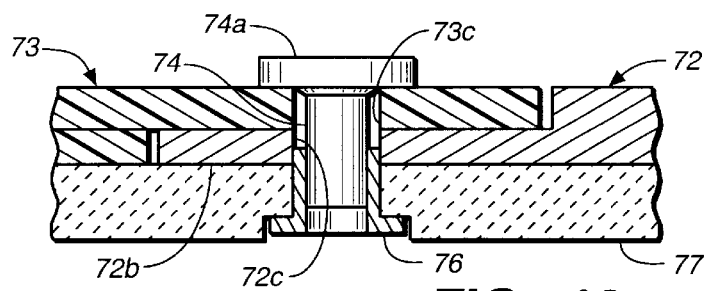
FIG._13
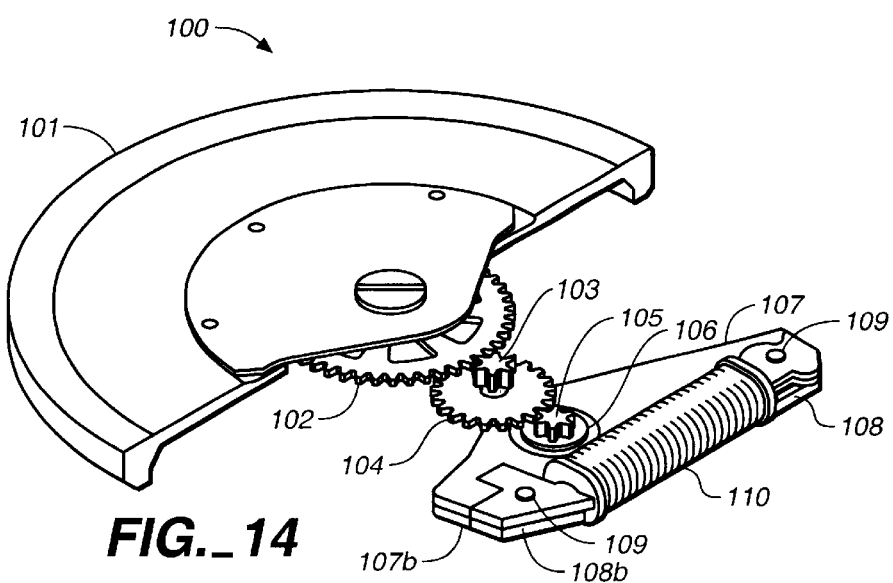
FIG._14

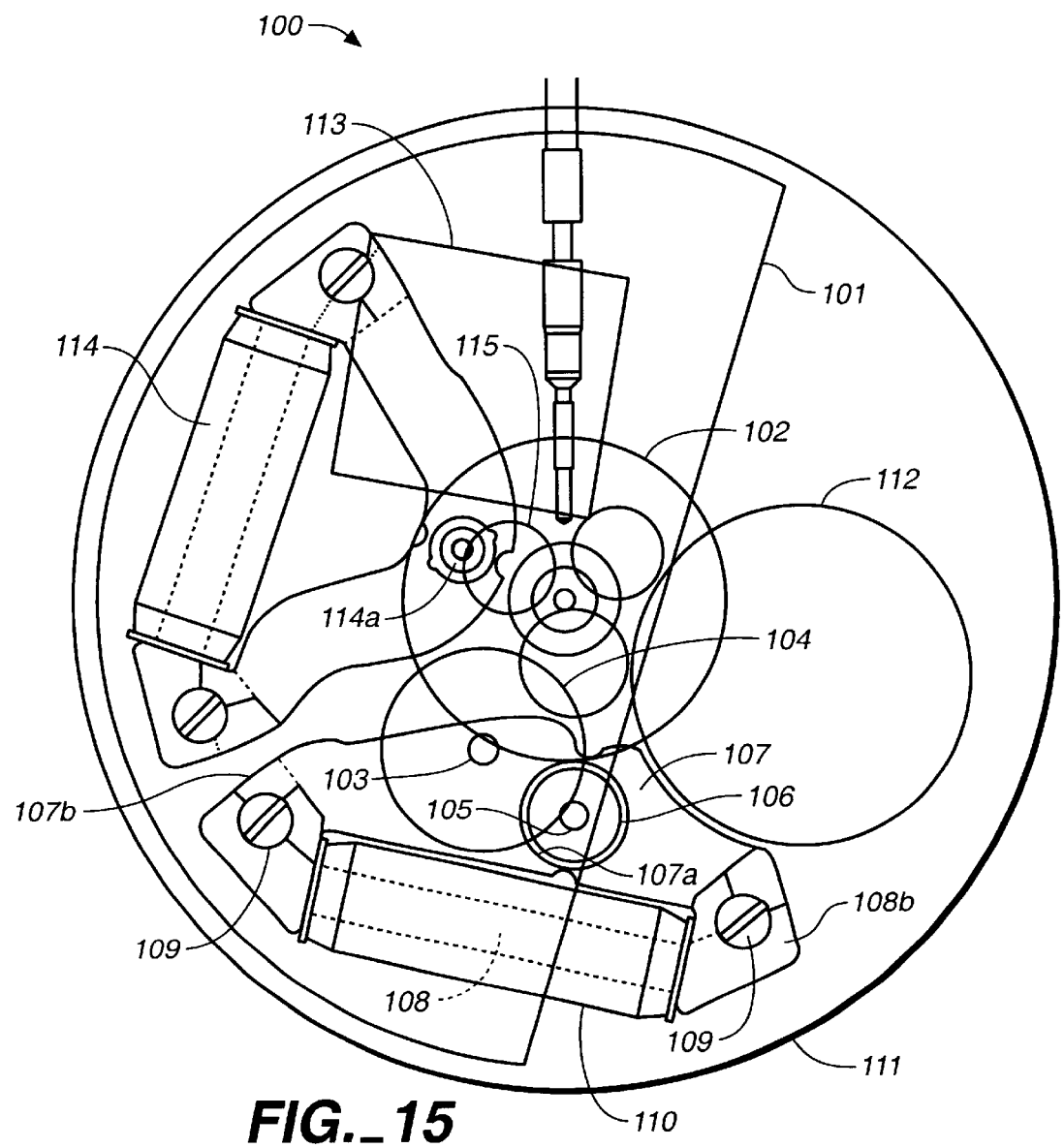
FIG._15

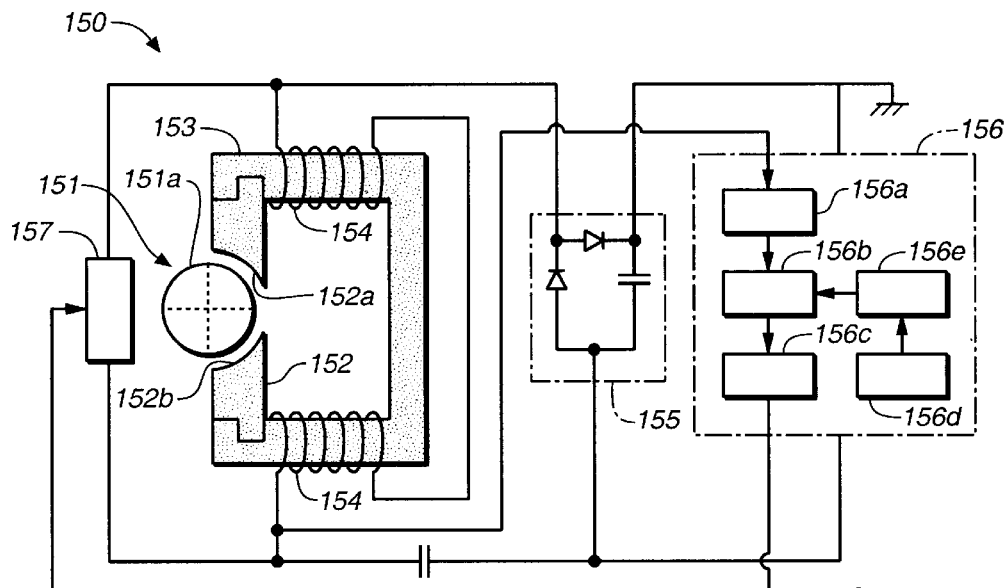
*FIG._16*
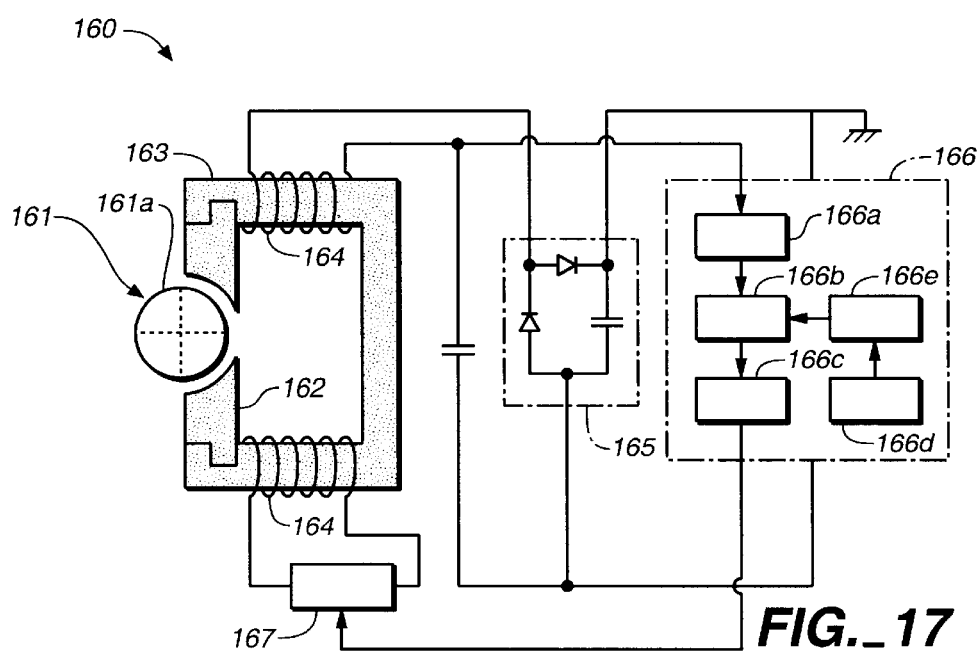
*FIG._17*

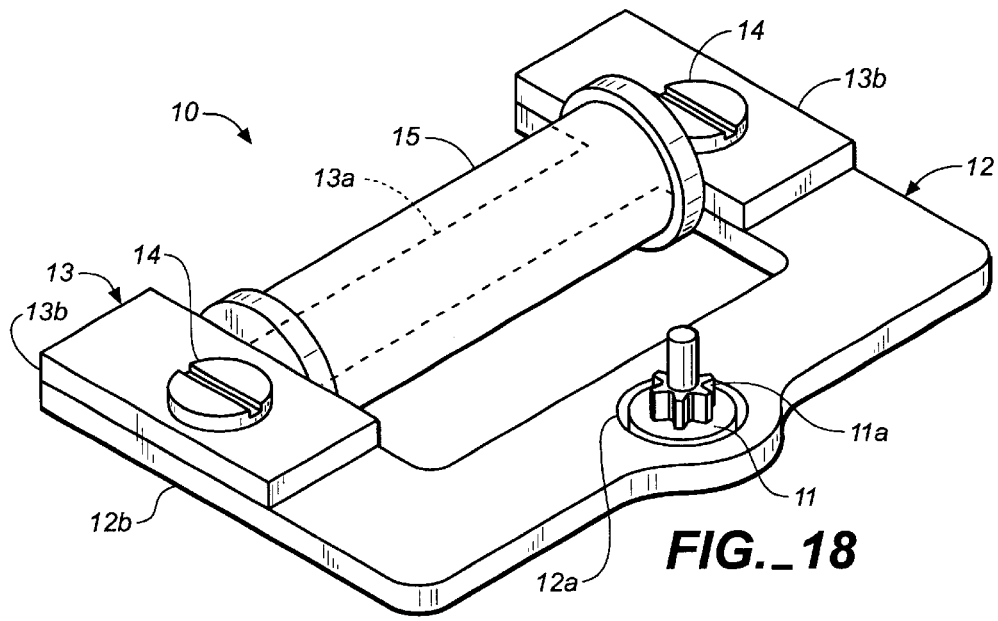
FIG._18
PRIOR ART
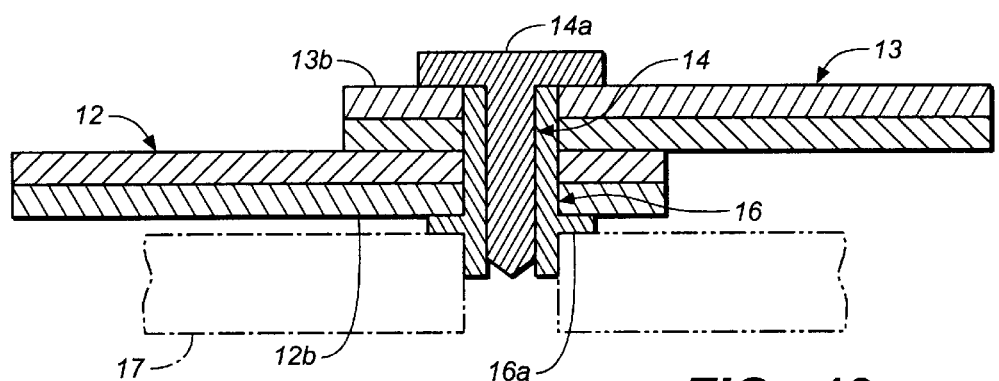
FIG._19
PRIOR ART

MAGNETIC CIRCUIT STRUCTURE, AND POWER-GENERATING DEVICE AND ELECTRONIC DEVICE USING THE SAME

TECHNICAL FIELD

The present invention relates to a magnetic circuit structure, and to a power-generating device and an electronic device using the structure. More particularly, the present invention relates to the structure of a magnetic circuit constructed by laminated members composed of stacked magnetic materials.

BACKGROUND ART

Small portable electronic devices, such as electronic wristwatches, sometimes have small power-generating devices built therein, which generate electric power by being driven by kinetic energy produced by rotation or swing of an oscillating weight in response to movement of the device. FIG. 18 shows the structure of the principal part of such a small power-generating device. FIG. 18 is a general perspective view showing the general structure of a power-generating section of a power-generating device 10 built in an electronic wristwatch.

The electronic wristwatch with the power-generating device 10 built therein includes, although not shown, an oscillating weight supported rotatably on the center of rotation so as to have a biased weight distribution, and a transmission gear train connected to the oscillating weight. The transmission gear train is meshed with a gear portion 11a integrally formed with a rotatably supported rotor 11 so as to rotate the rotor 11. The rotor 11 rotates inside a rotor hole 12a formed at about the center of a stator yoke 12 which is composed of stacked magnetic layers or magnetic plates of a thin soft magnetic material in order to reduce core loss. The outer peripheral portion of the rotor 11 functions as a rotor magnetic pole, and the inner peripheral surface of the rotor hole 12a of the stator yoke 12 functions as a stator magnetic pole. Both end portions 12b of the stator yoke 12 are in contact with both end portions 13b of a magnetic core 13 so as to overlap with the lower sides thereof. In this state, the stator yoke 12 and the magnetic core 13 are fixedly joined by joint screws 14. An electromagnetic coil 15 is wound on a shaft portion 13a of the magnetic core 13. The magnetic core 13 also has a structure in which magnetic plates made of a thin soft magnetic material are stacked, in a manner similar to that of the stator yoke 12.

FIG. 19 is an enlarged general schematic sectional view showing a joint section between the stator yoke 12 and the magnetic core 13 in the above-described power-generating device 10. The stator yoke 12 and the magnetic core 13 shown in this figure are each formed of a laminate of two magnetic plates. The end portion 12b of the stator yoke 12 and the end portion 13b of the magnetic core 13 are provided, respectively, with joint holes of corresponding shapes at corresponding planar positions. A tube 16 press-fitted in a main plate 17 is passed through the joint holes, and the joint screw 14 is screwed into the tube 16. The end portion 12b of the stator yoke 12 and the end portion 13b of the magnetic core 13 are vertically clamped by a head portion 14a of the joint screw 14 and a flange portion 16a of the tube 16, and are thereby fixedly joined to each other.

Attempts have been made to reduce the size and weight of the above conventional power-generating device 10 by various design efforts, for example, simplification of the shape and reduction in thickness. However, such size reduction of the power-generating device imposes structural restrictions, and makes it difficult to improve power-generating efficiency by reducing magnetic resistance of the magnetic circuit. In particular, in the case of an electronic wristwatch with a power-generating device, it is necessary to efficiently generate power by a small amount of kinetic energy of an oscillating weight built in a small wristwatch case, and to thereby ensure electric power for driving the wristwatch. Accordingly, improvement of power-generating efficiency is a significantly important problem.

In order to improve power-generating efficiency, it is necessary to reduce magnetic resistance of a magnetic circuit constituted by the rotor 11, the stator yoke 12, and the magnetic core 13 in the power-generating device 10. However, since the principal part of the magnetic circuit has a structure, in which the stator yoke 12 and the magnetic core 13 are joined, as shown in FIG. 19, from the viewpoint of structure and manufacturing cost, leakage magnetic flux cannot be reduced for some reasons, for example, a stepped structure in the joint section. This increases magnetic resistance and decreases effective magnetic flux.

Accordingly, the present invention solves the above problems, and an object of the invention is to achieve a new magnetic circuit structure capable of reducing magnetic resistance, and to provide a power-generating device with improved power-generating efficiency by using the magnetic circuit structure. Another object of the present invention is to achieve a magnetic circuit structure, in particular, suitable for a downsized power-generating device so as to improve power-generating efficiency of power-generating devices built in various electronic devices and to improve the performance of the electronic devices.

DISCLOSURE OF THE INVENTION

In order to overcome the above problems, the present invention provides a magnetic circuit structure including first and second laminated members each composed of a plurality of stacked magnetic materials, and a joint means for holding an end portion of the first laminated member and an end portion of the second laminated member joined to each other, the first and second laminated members joined to each other constituting at least a part of a magnetic circuit, wherein the end portions of the first and second laminated members are provided with opposing concave structures, as viewed from a predetermined direction, so that the opposing concave structures have corresponding shapes, and are joined by the joint means in a state in which the opposing concave structures are mated in a staggered manner, and an end face of a magnetic material of the first laminated member and an end face of a magnetic material of the second laminated member disposed at corresponding positions in the layer-stacking direction are in contact with each other.

According to this invention, since the first laminated member and the second laminated members are joined by the joint means while the opposing concave structures formed in the end portions thereof are mated in a staggered manner, the joint area therebetween is increased. Moreover, since the end faces of the magnetic materials in the end portions of the first laminated member and the second laminated member disposed at corresponding positions in the layer-stacking direction are in contact with each other, magnetic flux is allowed to pass in the planar direction of the laminated members without passing through a stepped portion or a gap. This makes it possible to reliably reduce magnetic resistance in the joint section and to increase effective magnetic flux in the magnetic circuit. Mating of the opposing concave structures mechanically stabilizes the joint state and facilitates assembly operation.

Furthermore, the present invention provides a magnetic circuit structure including first and second laminated members each composed of a plurality of stacked magnetic materials, and a joint means for holding an end portion of the first laminated member and an end portion of the second laminated member joined to each other, the first and second laminated members joined to each other constituting at least a part of a magnetic circuit, wherein the end portions of the first and second laminated members are provided with opposing concave structures, as viewed from a predetermined direction, so that the concave structures have corresponding shapes, and are joined by the joint means in a state in which the opposing concave structures are mated in a staggered manner, and the opposing concave structures are formed to appear semi-cylindrical, as viewed from both the layer-stacking direction and the planar direction of the magnetic materials in the first laminated member and the second laminated member, and are mated in a staggered manner in both the layer-stacking direction and the planar direction.

According to this invention, since the opposing concave structures in the end portions of the laminated members appear semi-cylindrical, as viewed in both the layer-stacking direction and the planar direction orthogonal to each other, it is possible to increase the joint area between the first laminated member and the second laminated member in the joint section, to reduce magnetic resistance, to improve stability of the joint position, and to reduce joint displacement. This can facilitate assembly operation.

In this invention, it is preferable that the end portion of the first laminated member and the end portion of the second laminated portion have contact face portions which extend in the direction of mating thereof and are in contact with each other. According this means, it is possible to further increase the joint area between the first laminated member and the second laminated member, and to further reduce magnetic resistance.

In this invention, it is preferable that the opposing concave structures be formed by the difference in position of end faces of the stacked magnetic materials in the first laminated member and the second laminated member. According to this means, since the opposing concave structures are formed by the difference in position of the end faces of the magnetic materials, it is possible to facilitate production, to ensure joint correspondence between the end faces of the magnetic materials, and to prevent the joint from being displaced in the layer-stacking direction. This further facilitates assembly operation and further reduces magnetic resistance.

In this invention, it is preferable that the joint means joins the first laminated member and the second laminated member by a fastening member that is passed through the end portions of the first laminated member and the second laminated member with the opposing concave structures mated with each other. According to this means, since the laminated members are joined by the fastening member of the joint means in the joint section where the opposing concave structures of the laminated members are mated, there is no need to place the joint means in a section other than the joint section, and the size of the magnetic circuit structure is thereby reduced.

In this invention, it is preferable that at least a portion of the fastening member to be passed through the end portions of the first laminated member and the second laminated member be made of a soft magnetic material. According to this means, since at least a portion of the fastening member to be passed through the joint section is made of a soft magnetic material, it is possible to pass magnetic flux through the portion of the fastening member, and to thereby further reduce magnetic resistance in the joint section. Herein, the fastening member refers to a member for contributing to joining by the joint means, and corresponds to a joint screw and a tube in embodiments which will be described later.

In this invention, it is preferable that the fastening member be composed of a tube inserted in the end portions of the first laminated member and the second laminated member and a joint screw screwed in the tube, and that at least one of the tube and the joint screw be made of a soft magnetic material. According to this means, since both the tube and the joint screw are passed through the joint section, magnetic resistance in the joint section can be reduced by making at least one of the tube and the joint screw of a soft magnetic material. In particular, it is more preferable that both the tube and the joint screw be made of a soft magnetic material.

In this invention, it is preferable that the joint means be provided with a pressing member for pressing the end portions of the first laminated member and the second laminated member, with the opposing concave structures mated, in a direction such that the end portions approach each other. According to this means, the first laminated member and the second laminated member can be pressed against each other in the joint section by being pressed by the pressing member in a direction such that the laminated members approach, the contact (abutting) state of at least a part of the end faces can be made reliable. Even when some end face portions are not in contact with each other, they can be caused to approach, thereby reducing magnetic resistance in the joint section.

In this invention, it is preferable that the pressing member be placed outside the joint section between the first laminated member and the second laminated member. In this case, since the first laminate member and the second laminated member are joined by being pressed toward the joint section from the outside of the joint section by the joint means, there is no need to provide a fastening member or the like in the joint section, and the structure of the joint section can be further simplified.

In this invention, it is preferable that the pressing member be placed so as to be in contact with a side face portion of at least one of the first laminated member and the second laminated member opposite from the end portion and so as to move in a predetermined direction, that at least one of the side face portion and the pressing member be provided with an inclined face which is in contact with the other and is inclined in the predetermined direction, and that the end portions of the first laminated member and the second laminated member be pressed in such a direction as to approach along the inclined face by moving the pressing member in the predetermined direction.

In this invention, it is preferable that the pressing member be a fastening member placed inside the joint section between the first laminated member and the second laminated member so as to fasten the first laminated member and the second laminated member, and that the first laminated member and the second laminated member be pressed in such a direction as to approach (or in the direction of mating of the opposing concave structures in the end portions) by fastening the fastening member. In this case, it is preferable that the fastening member be a joint screw, that the first laminated member and the second laminated member be fastened by rotating the joint screw, and that at least one of the joint screw and the first or second laminated member be provided with a tapered inclined face for pressing the end portions of the laminated members in such a direction as to approach by rotating the joint screw.

In a case in which the joint means in the above means presses the first laminated member and the second laminated member in the joint section, it is preferable that the joint means include a joint screw, and that contact face portions contacting with each other in a direction opposite from the direction of mating of the opposing concave structures (for example, side face portions of concave portions in the opposing concave structures (for example, side faces extending in the mating direction) be pressed in such a direction as to be closely contacted with each other, based on resistance produced in response to the rotation of the joint screw).

The present invention provides a power-generating device having a magnetic circuit structure in any of the above descriptions and a power-generating section, wherein the power-generating section includes a rotatable rotor having a rotor magnetic pole, a stator yoke having a stator magnetic pole opposing the rotor magnetic pole, and a stator having a magnetic core magnetically connected to the stator yoke and an electromagnetic coil wound on the magnetic core, and wherein the magnetic circuit structure is applied to the stator. According to this invention, it is possible to improve power-generating efficiency without increasing the size of the power-generating device. Herein, the first laminated member and the second laminated member correspond to, for example, the stator yoke and the magnetic core.

When there is provided an electronic device equipped with the power-generating device, a longer operation can be expected without a power supply by improving power-generating efficiency. This is particularly effective in a portable electronic device.

It is preferable that an oscillating weight having a biased weight distribution be provided rotatably on the center of rotation and be connected to the rotor. Power can be produced by transmitting the rotation or swing of the oscillating weight to the rotor, and electric power can be taken from the electromagnetic coil.

When an electronic wristwatch is constructed in which a motor is driven by electric power obtained by the power-generating device, it is preferable that the stator structure of the motor adopt the magnetic circuit structure of the present invention.

In this invention, it is preferable that the electronic device include a detection means for detecting the state of rotation of the rotor based on electromotive force generated by the electromagnetic coil, and a rotation control means for magnetically controlling the state of rotation of the rotor via the stator according to a detection value of the detection means. According to this means, since the stator structure of the present invention allows electric power to be efficiently generated by an even small torque, it is possible to reliably operated the rotation control means. It is also possible to improve controllability of the electromagnetic rotation control itself via the stator.

The present invention provides an electronic device including an energy generating means for generating mechanical energy, a gear train for transmitting the mechanical energy, a pointer to be driven by the gear train, the power-generating device to be driven by the gear train, a reference signal generating means for generating a reference signal, and a rotation control means for comparing a rotation signal having a cycle corresponding to the rotation cycle of the rotor in the power-generating device with the reference signal and outputting a rotation control signal for the rotor to the power-generating device according to the result of the comparison so as to exert electromagnetic braking force on the rotor, wherein at least the reference signal generating means and the rotation control means are driven by electromotive force of the power-generating device.

More specifically, there is provided an electronic wristwatch in which rotation energy generated by an oscillating weight is accumulated by a spring or the like, a power-generating device is driven by using the rotation energy, the rotation speed of a rotor is detected based on the output of the power-generating device, an electromagnetic coil wound on a stator is short-circuited according to the rotation speed by a control circuit so as to apply electromagnetic braking force, thereby generating electric power while controlling the rotation rate of the rotor of the power-generating device to be constant, and driving a pointer by the rotation of the rotor.

BRIEF DESCRIPTION OF THE DRAWINGS

In the drawings, wherein like reference symbols refer to like parts:

FIG. 1 is an assembly plan view showing the structures of a magnetic circuit structure and a power-generating device according to a first embodiment of the present invention.

FIG. 2 is an exploded plan view of the first embodiment.

FIG. 3 is a cross-sectional view taken along line III—III in FIG. 1, as viewed from the direction of the arrows.

FIG. 4 is a cross-sectional view taken along line IV—IV in FIG. 1, as viewed from the direction of the arrows.

FIG. 5 is an enlarged perspective view schematically showing the structure of a joint section in the first embodiment.

FIG. 6 is an assembly plan view showing the structures of a magnetic circuit structure and a power-generating device according to a second embodiment of the present invention.

FIG. 7 is an exploded plan view of the second embodiment.

FIG. 8 is an enlarged perspective view schematically showing the structure of a joint section in a magnetic circuit structure and a power-generating device according to a third embodiment of the present invention.

FIG. 9 is a general sectional view showing the general structure of a joint section in a magnetic circuit structure and a power-generating device according to a fourth embodiment of the present invention.

FIG. 10 is a general perspective view of a joint section in a magnetic circuit structure and a power-generating device according to a fifth embodiment of the present invention.

FIG. 11 is a schematic sectional view showing the structure of the joint section in the fifth embodiment.

FIG. 12 is a general perspective view showing the general structure of a joint section in a comparative example of the fifth embodiment.

FIG. 13 is a general sectional view of the comparative example shown in FIG. 11.

FIG. 14 is a perspective view showing the principal part of a power-generating device built in an electronic wristwatch according to a sixth embodiment of the present invention.

FIG. 15 is a plan layout view showing the general internal structure of the sixth embodiment.

FIG. 16 is a general circuit diagram showing the circuit configuration of an electronic wristwatch according to a seventh embodiment of the present invention.

FIG. 17 is a general circuit diagram showing the circuit configuration of an electronic wristwatch according to a modification of the seventh embodiment.

FIG. 18 is a general perspective view showing the structure of the principal part of a conventional power-generating device.

FIG. 19 is a general sectional view schematically showing the structure of a joint section in a magnetic circuit of the conventional power-generating device.

BEST MODE FOR CARRYING OUT THE INVENTION

Embodiments of a magnetic circuit structure and a power-generating device according to the present invention will now be described with reference to the attached drawings. The embodiments described below are suitably built in various electronic devices, such as an electronic wristwatch, a portable telephone, and a portable information terminal with a power-generating device, in a manner similar to that of the device shown in FIGS. 18 and 19. The present invention is not limited to the embodiments and is also applicable to power-generating devices for various uses. Furthermore, the present invention is also applicable to magnetic circuit structures for various uses except for the power-generating devices.

First Embodiment

FIG. 1 is an assembly view showing the structure of a power-generating section of a power-generating device 20 according to a first embodiment of the present invention, and FIG. 2 is an exploded and partly sectional view of the first embodiment. The power-generating device 20 comprises a disklike rotor 21 supported rotatably, a stator yoke 22 structured so as to accommodate the rotor 21 in a rotor hole 22a formed at the center thereof, a magnetic core 23 with both end portions 23b joined to both end portions 22b of the stator yoke 22 by joint screws 24, and an electromagnetic coil 25 wound on a shaft portion 23a of the magnetic core 23. In order to reduce core loss (eddy current loss) in a magnetic circuit formed in the power-generating device 20, the stator yoke 22 and the magnetic core 23 have a multi-layered structure composed of stacked magnetic plates of a thin soft magnetic material.

In both end portions 22b of the stator yoke 22, as shown in FIG. 2, upper projecting portions 22b-1 are formed on the outer side by only upper layer portions which project toward the magnetic core 23, and lower projecting portions 22b-2 are formed on the inner side by only lower layer portions which project. Under the upper projecting portions 22b-1, no magnetic plates lie, and the lower layer portions at both end portions 22b of the stator yoke 22 are recessed from leading end faces 22b-1a of the upper projecting portions 22b-1 to a great extent so as to form end faces 22b-2b thereat, as shown by dotted lines in the figure. On the lower projecting portions 22b-2, no magnetic plates lie, and the upper layer portions are recessed from leading end faces 22b-2a of the lower projecting portions 22b-2 to a great extent so as to form end faces 22b-1b thereat. In about the centers of the end portions 22b, joint holes 22c of circular cross section are formed so as to partly cut off the upper projecting portions 22b-1 and the lower projecting portions 22b-2.

In contrast, in both end portions 23b of the magnetic core 23, upper projecting portions 23b-1 are formed on the inner side by only upper layer portions which project toward the stator yoke 22, and lower projecting portions 23b-2 are formed on the outer side by only lower layer portions which project. Under the upper projecting portions 23b-1, no magnetic plates lie, and the lower layer portions of the end portions 23b of the magnetic core 23 are recessed from leading end faces 23b-1a of the upper projecting portions 23b-1 to a great extent so as to form end faces 23b-2b thereat, as shown by dotted lines in the figure. On the lower projecting portions 23b-2, no magnetic plates lie, and the upper layer portions are recessed from leading end faces 23b-2 of the lower projecting portions 23b-2 to a great extent so as to form end faces 23b-1b thereat. In about the centers of the end portions 23b, joint holes 23c of circular cross section are formed so as to partly cut off the upper projecting portions 23b-1 and the lower projecting portions 23b-2.

The above-described opposing concave structures at the end portions 22b of the stator yoke 22 and at the end portions 23b of the magnetic core 23 are for med to be mated with each other in a staggered manner. FIGS. 3 to 5 show the correspondence between the opposing concave structures of the end portions 22b and the opposing concave structures of the end portions 23b. FIG. 3 shows a state, taken along line III—III in FIG. 1, and FIG. 4 shows a state, taken along line IV—IV in FIG. 1. FIG. 5 is a perspective view showing the structures of the end portions of the stator yoke and the magnetic core.

When the opposing concave structures are mated, as shown in FIG. 3, the upper projecting portion 22b-1 of the stator yoke 22 is fitted in the recessed portion formed on the lower projecting portion 23b-2 of the magnetic core 23, and the lower projecting portion 23b-2 of the magnetic core 23 is fitted in the recessed portion formed under the upper projecting portion 22b-1 of the stator yoke 22. In this state, the stator yoke 22 and the magnetic core 23 are fixedly clamped by the joint screw 24 and a tube 26.

Although not shown in FIG. 3, similarly, the lower projecting portion 22b-2 of the stator yoke 22 is fitted in the recessed portion formed under the upper projecting portion 23b-1 of the magnetic core 23, and the upper projecting portion 23b-1 of the magnetic core 23 is fitted in the recessed portion formed on the lower projecting portion 22b-2 of the stator yoke 22.

In the above structure, the leading end face 22b-1a of the upper projecting portion 22b-1 in the stator yoke 22 is in contact with the end face 23b-1b of the end portion 23b in the magnetic core 23 disposed at a corresponding position in the layer-stacking direction (that is, at the same height), and the leading end face 23b-2a of the lower projecting portion 23b-2 in the magnetic core 23 is in contact with the end face 22b-2b of the end portion in the stator yoke 22 disposed at a corresponding position in the layer-stacking direction. Similarly, the leading end face 23b-1a of the upper projecting portion 23b-1 in the magnetic core 23 is in contact with the end face 22b-1b of the end portion in the stator yoke 22 disposed at a corresponding position in the layer-stacking direction, and the leading end face 22b-2a of the lower projecting portion 22b-2 in the stator yoke 22 is in contact with the end face 23b-2b of the end portion 23b in the magnetic core 23 disposed at a corresponding position in the layer-stacking direction.

As shown in FIGS. 1 and 2, a side face of the upper projecting portion 22b-1 of the stator yoke 22 and a side face of the upper projecting portion 23b-1 of the magnetic core 23 are in contact with each other, and a side face of the lower projecting portion 22b-2 of the stator yoke 22 and a side face of the lower projecting portion 23b-2 of the magnetic core 23 are also in contact with each other. These side faces extend in a direction of mating of the end portions 22b and 23b (a direction orthogonal to the leading end faces and the end faces) so as to form contact face portions where they contact each other.

In this embodiment, as shown in FIG. 5, the two upper and lower projecting portions 22b-1 and 22b-2 formed in the end portion 22b of the stator yokes 22 and the two upper and lower projecting portions 23b-1 and 23b-2 formed in the end portion 23b of the magnetic core 23 constitute opposing concave structures in the layer-stacking direction (the upward and downward direction in the figure) and in the planar direction (the horizontal direction in the figure). These opposing concave structures in both directions are mated and closely fitted.

As shown in FIG. 4, the joint screw 24 and the tube 26 have shapes substantially similar to the conventional ones. The cylindrical tube 26 is formed so as to be press-fitted in a hole formed in a main plate 27. The end portion 22b of the stator yoke 22 and the end portion 23b of the magnetic core 23 are joined by being vertically clamped by a flange portion 26a of the tube 26 and a head portion 24a of the joint screw 24 screwed therein.

While the joint screw 24 and the tube 26 are conventionally made of a nonmagnetic material, both the joint screw 24 and the tube 26 serving as fastening members are made of a soft magnetic material in this embodiment. Since the joint screw 24 and the tube 26 pass through the joint section between the end portion of 2b the stator yoke 22 and the end portion of the magnetic core 23 so as to extend in the layer-stacking direction, when they are made of a soft magnetic material, magnetic flux is more easily transmitted in the layer-stacking direction and magnetic resistance is reduced. This is particularly advantageous in allowing magnetic flux to be more easily transmitted in the layer-stacking direction. As a result of comparison and verification of cases in which the joint screw 24 and the tube 26 are or are not made of a soft magnetic material, the present inventors ascertained that substantially large effects can be obtained by making both the members of a soft magnetic material. Even when only one of the joint screw 24 and the tube 26 is made of a soft magnetic material, distinct effects can be obtained. Examples of soft magnetic materials forming the components in this embodiment are various iron alloys, such as ion and permalloy.

In this embodiment, there is formed a joint section between the end portions 22b and 23b of the stator yoke 22 and the magnetic core 23 constituting the principal part of the magnetic circuit in the power-generating device 20 as before. Since the joint section has a structure in which the opposing concave structures are mated with each other, the joint area between the stator yoke 22 and the magnetic core 23 can be increased. This makes it possible to reduce magnetic resistance, to increase effective magnetic flux, and to improve power-generating efficiency.

In particular, both the stator yoke 22 and the magnetic core 23 have a multilayered structure that reduces core loss, and opposing concave structures having stepped portions are formed between the layers using the multilayered structure, thereby reducing manufacturing cost and also reducing magnetic resistance.

In general, a magnetic member having a multilayered structure has the properties of having high magnetic permeability in a direction of travel of magnetic flux inside each magnetic layer, that is, in the planar direction, and easily transmitting the magnetic flux, and in contrast, of having low magnetic permeability in a direction of travel of magnetic flux through the magnetic layers, that is, in the layer-stacking direction, and not easily transmitting the magnetic flux. In the conventional Joint structure shown in FIG. 19, since the end portion 12b of the stator yoke 12 and the end portion 13b of the magnetic core 13 simply contact in the vertical direction, the joint area therebetween is small. Furthermore, since the stator yoke 12 and the magnetic core 13 contact only in the interlayer direction, magnetic flux cannot easily pass through the joint surface, and magnetic resistance is not reduced. In contrast, in this embodiment, since the end portions 22b and 23b of the stator yoke 22 and the magnetic core 23 are in contact with each other so that the opposing concave structures of the magnetic layers are mated, magnetic flux passes through the joint section in the planar direction, and easily passes through the joint surface. This also reduces magnetic resistance.

In particular, as described above, the leading end faces of the upper projecting portions and the lower projecting portions in the stator yoke and the magnetic core are in contact with corresponding end faces, the side faces of the upper projecting portion of the stator yoke and the upper projecting portion of the magnetic core are in contact with each other, and the side faces (contact face portions) of the lower projecting portion of the stator yoke and the lower projecting portion of the magnetic core are in contact with each other. Since the end faces and the side faces corresponding in the layer-stacking direction are in contact with each other, the joint area in the planar direction between the stator yoke and the magnetic core is increased, and magnetic resistance is substantially reduced.

The upper projecting portions 22b-1 and 23b-1 of the stator yoke 22 and the magnetic core 23 disposed at corresponding positions in the layer-stacking direction are in contact with each other at the contact face portions (portions where the side faces of the projecting portions contact) A extending in the direction of mating of the opposing concave structures of the stator yoke 22 and the magnetic core 23, as described above. Therefore, even when the depth of mating of the stator yoke 22 and the magnetic core 23 is changed due to displacement of the positions of the joint holes 22c and 23c for receiving the joint screws 24 and the tubes 26, the contact state of the contact face portions is not influenced thereby, which allows magnetic flux to be reliably transmitted. The above-described relationship also applies to the relationship between the lower projecting portions 22b-2 and 23b-2.

In this embodiment, the stator yoke 22 and the magnetic core 23 are each provided with an opposing concave structure in the direction of stacking of the magnetic plates, as shown from the relationship between the upper projecting portions 22b-1 and 23b-1 and the recessed portions formed thereunder, or between the lower projecting portions 22b-2 and 23b-2 and the recessed portions formed thereon. Simultaneously, the stator yoke 22 and the magnetic core 23 are each provided with an opposing concave structure in the planar direction of the stacked magnetic plates (that is, the direction of the surfaces of the magnetic plates), as shown from the relationship between the upper projecting portions 22b-1 and 23b-1 and the recessed portions formed on the sides thereof, or between the lower projecting portions 22b-2 and 23b-2 and the recessed portions formed on the sides thereof. In this way, in this embodiment, the joint section has the structures which appear cylindrical, as shown from both the layer-stacking direction and the planer direction orthogonal to each other, and the opposing concave structures are mated and joined. This markedly increases the joint area and substantially reduces magnetic resistance. Since such a configuration allows the stator yoke 22 and the magnetic core 23 to be mutually positioned in the layer-stacking direction and the planar direction, it is possible to facilitate assembly operation and to improve assembly accuracy and assembly strength.

In this embodiment, one of the above-described opposing concave structures shown from the layer-stacking direction, that is, the upward and downward direction, is formed by the difference in position between the end faces of the stacked magnetic plates constituting the stator yoke 22 and the magnetic core 23. This makes it possible to facilitate production, to ensure correspondence in joint position between the end faces of the magnetic plates, and to prevent joint displacement in the layer-stacking direction. Therefore, assembly operation is further facilitated, and magnetic resistance is further reduced.

The present invention is not limited to the above embodiment, and the opposing concave structures need not always be formed both in the layer-stacking direction and in the planar direction. It is satisfactory as long as opposing concave structures are formed in the joint section in either of the directions and are mated and joined.

Second Embodiment

A power-generating device 30 according to a second embodiment of the present invention will now be described with reference to FIGS. 6 and 7. In this embodiment, in end portions 32b of a stator yoke 32, upper projecting portions 32b-1 are formed by upper layer portions which project on the outer side, and lower projecting portions 32b-2 are formed by lower layer portions which project on the inner side. In end portions 33b of a magnetic core 32, upper projecting portions 33b-1 are formed by upper layer portions which project on the inner side, and lower projecting portions 33b-2 are formed by lower layer portions which project on the outer side.

In this embodiment, in a manner similar to that of the first embodiment, opposing concave structures are formed in both the end portions 32b of the stator yoke 32 and the end portions 33b of the magnetic core 33, as viewed from the layer-stacking direction and the planar direction. However, this embodiment is different in that the upper projecting portions 32b-1 and 33b-1 and the lower projecting portions 32b-2 and 33b-2 have a substantially triangular planar shape, in that the upper projecting portions 32b-1 and 33b-1 contact at inclined end faces 32b-1a and 33b-1a inclined in the joining direction, and in that the lower projecting portions 32b-2 and 33b-2 similarly contact at inclined end faces 32b-2a and 33b-2a.

This embodiment also provides the advantages similar to those of the first embodiment. In this embodiment, since the inclined end faces inclined in the joining direction, in which the stator yoke 32 and the magnetic core 33 are joined (in the upward and downward direction in the figure), are in contact with each other, even when the stator yoke 32 and the magnetic core 33 are not completely and closely fitted due to errors in shape and size or the like, the inclined end faces reliably contact with each other. Since this can inhibit any gap from being formed between end faces of the magnetic plates disposed at corresponding positions in the layer-stacking direction in a joint section, magnetic resistance can be reduced more reliably.

Third Embodiment

A third embodiment of the present invention will now be described with reference to FIG. 8 that schematically shows the structure of a joint section. This embodiment has a structure similar to that in the above embodiments, except for the shape of the joint section (the shapes of end portions of a stator yoke and a magnetic core). In this embodiment, in order to form joint holes in end portions of a stator yoke 42 and a magnetic core 43 so as to receive joint screws and tubes, a semicircular opening portion 42c opened at the leading end is formed in an end portion 42b of the stator yoke 42, and a semicircular opening portion 43c opened at the leading end is formed in an end portion 43b of the magnetic core 43.

Since the opening portions 42c and 43c have such an open (cutout) shape that is opened sideward, the end portions of the stator yoke and the magnetic core constituting the joint section can be shaped more easily than in the above embodiments, and production is facilitated. Even when there is some displacement (nonalignment) in the positional relationship between the opening portions 42c and 43c constituting a joint hole, and leading end faces 42b-1a, 42b-2a, 43b-1a, and 43b-2a and end faces 42b-1b, 42b-2b, 43b-1b, and 43b-2b to be in contact with each other in the joint section, gaps are seldom formed between the leading end faces and the end faces in both the end portions 42b and 43b.

In this embodiment, upper projecting portions 42b-1 and 43b-1 and lower projecting portions 42b-2 and 43b-2 also form opposing concave structures in the layer-stacking direction and the planer direction, and are fitted to each other.

Fourth Embodiment

A magnetic circuit structure and a power-generating device according to a fourth embodiment of the present invention will now be described with reference to FIG. 9. FIG. 9 is a schematic sectional view showing the structure of a joint section between a stator yoke 52 and a magnetic core 53 in a power-generating device 50 according to the fourth embodiment. This embodiment is similar to the above embodiments in that upper projecting portions 52b-1 are formed in end portions 52 of the stator yoke 52, lower projecting portions 53b-2 are formed in end portions 53b of the magnetic core 53, and the portions are mated and joined.

In this embodiment, a joint means is not provided inside a joint section, and a pair of joint screws 54 and 55 and nearly cylindrical pressing members 56 and 57 are formed outside the joint section in order to press the stator yoke 52 and the magnetic core 53 in the joint section in a direction such that they approach each other, as shown in the figure.

The joint screws 54 and 55 are passed through the pressing members 56 and 57 and are threadedly engaged with internally threaded portions 58a and 58b embedded in a main plate 58. The pressing members 56 and 57 are provided, at least on the sides of the stator yoke 52 and the magnetic core 53, with tapered pressing faces 56a and 57a slightly inclined with respect to the vertical plane. In order to press the pressing faces 56a and 57a, pressed faces 52c and 53c of the stator yoke 52 and the magnetic core 53 are tapered corresponding thereto. When the joint screws 54 and 55 passed through the pressing members 56 and 57 are screwed into the internally threaded portions 58a and 58b embedded in the main plate 58, the pressing faces 56a and 57a press the-pressed faces 52c and 53c. The end portion 52b of the stator yoke 52 and the end portion 53b of the magnetic core 53 are thereby pressed against each other and are joined.

According to this structure, there is no need to form joint holes in the joint section so as to pass joint screws therethrough, and the structure of the joint section can be further simplified. Since the end faces of the stator yoke and the magnetic core placed in the joint section can be pressed so that they are closely contacted, the contact therebetween is reliable, and magnetic resistance is further reduced.

Fifth Embodiment

A magnetic circuit structure and a power-generating device according to a fifth embodiment of the present invention will now be described with reference to FIGS. 10 and 11. FIG. 10 is a schematic perspective view showing the structure of a joint section in the fifth embodiment, and FIG. 11 is a schematic sectional view showing the structure of the joint section in the fifth embodiment.

This embodiment provides a structure in which a joint means substantially functionally equivalent to the joint means in the fourth embodiment is provided inside a joint section in the structure similar to that of the joint section in the first embodiment. In a power-generating device 60, an end portion 62b of a stator yoke 62 and an end portion 63b of a magnetic core 63 are fixedly clamped by threaded engagement between a joint screw 64 and a tube 66. In the end portions 62b and 63b, upper projecting portion 62b-1 and 63b-1 and lower projecting portions 62b-2 and 63b-2 are formed in a manner substantially similar to the first embodiment, and the projecting portions are mated in a staggered manner in the layer-stacking direction (the upward and downward direction in the figure) and in the horizontal direction (the direction orthogonal to the plane of the drawing).

In this embodiment, the upper projecting portion 63b-1 and the lower projecting portion 62b-2 overlapping therewith are formed to be wider than the upper projecting portion 62b-1 and the lower projecting portion 63b-2. Only the upper projecting portion 63b-1 and the lower projecting portion 62b-2 are provided, respectively, with joint holes 62c and 63c.

A head portion 64a of the joint screw 64 is tapered, and the inner peripheral surface of the joint hole 63c to be engaged with the head portion 64b is tapered corresponding to the head portion 64a, as shown in the figure. The joint hole 63c is eccentrically formed with respect to the joint hole 62c and the press-fitting position of the tube 66 in the main plate 67. For this reason, when the joint screw 64 is screwed into the tube 66, the tapered face of the head portion 64a of the joint screw 64 gradually presses the open edge of the joint hole 63c in the joint direction (a direction in which the stator yoke 62 and the magnetic core 63 are mated, approach, and contact).

According to this embodiment, when the joint screw 64 is screwed into the tube 66, the stator yoke 62 and the magnetic core 63 can be pressed in the joining direction, the convex and concave structures formed in the end portions of both the members are mated more closely. For example, the leading end face of the upper projecting portion 63b-1 is pressed to be abutted against the base end face disposed on the lower projecting portion 63b-2 in the stator yoke 63, and approaches or contacts therewith. Since the stator yoke 62 and the magnetic core 63 are reliably mated and joined, magnetic resistance is further reduced, and an assembly gap is seldom formed between the stator yoke and the magnetic core.

According to this embodiment, when the joint screw 64 is screwed into the tube 66, the stator yoke 62 and the magnetic core 63 can be pressed in the joining direction, the opposing concave structures formed in the end portions of both the members are mated more closely. For example, the leading end face of the upper projecting portion 63b-1 is pressed to be abutted against the base end face disposed on the lower projecting portion 63b-2 in the stator yoke 63, and approaches or contacts therewith. Since the stator yoke 62 and the magnetic core 63 are reliably mated and joined, magnetic resistance is further reduced, and an assembly gap is seldom formed between the stator yoke and the magnetic core.

In particular, in the comparative example, when the depth of mating of the stator yoke 72 and the magnetic core 73 changes, the gap formed between the portions at corresponding positions (heights) in the thickness direction (the layer-stacking direction, that is, the upward and downward direction in the figure), also changes. Therefore, the amount of magnetic resistance varies depending on variations in mating. In contrast, in the fifth embodiment of FIG. 10 a contact face portion A, where the side face of the upper projecting portion 62b-1 and the side face of the upper projecting portion 63b-1 contact, extends in the mating direction F in the figure. Therefore, even if the depth of mating changes, the contact state of the contact face portion A hardly changes. Since the joint screw 64 is tightened by being rotated clockwise in the fifth embodiment, the upper projecting portion 63b-1 is offset toward the upper projecting portion 62b-1 (toward the contact face portion A) due to the resistance of rotation of the joint screw 64 for tightening, thereby reliably contacting the end faces at the contact face portion A.

While the stator yoke and the magnetic core have four- or two-layer structures in the description of the above embodiments, the number of stacked layers of the members may be arbitrarily set. For example, the members may have a greater number of stacked layers.

Sixth Embodiment

The configuration of a sixth embodiment of the present invention will now be described with reference to FIGS. 14 and 15. The sixth embodiment shows an embodiment of an electronic device, more specifically, an electronic wristwatch equipped with a power-generating device having a magnetic circuit structure shown in the above embodiments.

An electronic wristwatch 100 of this embodiment comprises, as shown in FIGS. 14 and 15, an oscillating weight 101 having a weight distribution biased in the rotational direction, and a speed-increasing gear train consisting of a gear 102 attached integrally with the oscillating weight 101, a gear 103 meshed with the gear 102, and a gear 104 fixed to the gear 103 in the rotating direction. The last gear 104 of the speed-increasing gear train is meshed with a gear portion 105 formed in a rotor 106 constituting a power-generating device.

The rotor 106 is rotatably supported inside a rotor hole 107a of a stator yoke 107. The stator yoke 107 is fixedly joined to a magnetic core 108 by fastening screws 109. An electromagnetic coil 110 is wound on the magnetic core 108. As shown in FIG. 15, opposing concave structures are mated in joint sections between end portions 107b of the stator yoke 107 and end portions 108b of the magnetic core 108, in a manner shown in the above embodiments.

In this embodiment, as shown in FIG. 15, the structure shown in FIG. 14 is housed inside a case member 111 of the wristwatch, and the structure constituting the electronic watch is also built therein. A storage battery 112 is a capacitor or a chemical secondary battery for accumulating electric power generated by the power-generating device, and an output potential therefrom is supplied to a watch control circuit 113.

Inside the case member 111, there is disposed a driving motor 114, such as a stepping motor, to be driven by the watch control circuit 113. The driving motor 114 serves- to drive pointers (for example, an hour hand and a minute hand), which are not shown, and a gear portion formed in a rotor 114a is meshed with a gear 115 of a speed reduction gear train. The driving motor 114 comprises a stator yoke, a rotor having a magnetic pole opposing the stator yoke, a magnetic core joined to the stator yoke, and an electromagnetic coil wound on the magnetic core, and has a structure similar to that of the above-described power-generating device.

The structure of the joint section shown in the above embodiments (the structure in which the opposing concave structures are mated) may be applied to a joint section between the stator yoke and the magnetic core in the driving motor 114. Since this makes it possible to reduce leakage magnetic flux in a magnetic circuit of the driving motor 114 and to increase the amount of effective magnetic flux, the output efficiency of the driving motor 14 can be improved. As a result, power consumption of the driving motor 114 can be reduced.

While the rotor of the above sixth embodiment shown in FIG. 15 basically has a dipole structure, the number of poles of the rotor and the stator is not limited in the present invention. For example, a multipolar generator with a rotor and a stator having more than four poles also provides equivalent advantages.

Seventh Embodiment

An electronic wristwatch 150 as an electronic device according to a seventh embodiment of the present invention will now be described. FIG. 16 shows a circuit configuration of an electronic wristwatch 150 of this embodiment. The electronic wristwatch 150 has a magnetic circuit structure composed of a stator yoke 152 and a magnetic core 153 having the structure of the joint section described in the above embodiments (a structure in which opposing concave structures are mated). A power-generating device built in the electronic wristwatch 150 comprises a rotor 151, a stator yoke 152 having a stator magnetic pole 152a opposing a rotor magnetic pole 151a formed in the rotor 151, a magnetic core 153 joined to the stator yoke 152 in a manner similar to the above embodiments, and a pair of electromagnetic coils 154 wound on the magnetic core 153.

This embodiment is configured so as to rotationally drive the rotor 151 by transmitting power from a drive source (not shown) to the rotor 151 via a transmission mechanism (not shown), and to drive a driven section (not shown) via the same transmission mechanism. This transmission mechanism serves to synchronously operate the drive source, the rotor, and the driven section.

A more specific example of this embodiment is an electronically controlled mechanical timepiece in which a rotational driving force output from a spring mechanism serving as a driving source, which is wound up by a rotatably supported oscillating weight, by another power source, or manually, is transmitted to a pointer serving as a driven section via a transmission gear train so as to drive the pointer, and is also transmitted to the rotor 151 so as to electromagnetically control the rotation state of the rotor and to govern the speed of the pointer.

In this embodiment, the pair of electromagnetic coils 154 are connected in series. One end of the series circuit supplies electric power to a control section 156 via a booster circuit 155 also functioning as a rectifier circuit, and the other end does so via a capacitor.

The control section 156 comprises a detection circuit 156a connected to the other end of the series circuit formed by the electromagnetic coils 154 so as to detect the rotation speed of the rotor 151, a comparator circuit 156b for comparing an output signal from the detection circuit 156a with a reference signal, a control circuit 156c for transmitting a control signal to a switch circuit 157, which will be described later, based on a comparison signal output from the comparator circuit 156b, an oscillation circuit 156d including a quartz resonator or the like, and a dividing circuit 156e for dividing a clock signal output from the oscillation circuit 156d and outputting a reference signal to the comparator circuit.

The switch circuit 157 short-circuits or disconnects both ends of the series circuit formed of the electromagnetic coils 154 in response to a control signal output from the above control circuit 156c. The switch circuit 157 is easily formed of a well-known type of diode circuit or transistor circuit.

In this structural example, when the rotor 151 rotates, electric power is supplied to the control section 156 by electromotive force generated by the electromagnetic coils 154, and the detection circuit 156a detects the rotation speed of the rotor 151. The rotation speed is compared with a reference signal output from the dividing circuit 156e. According to the comparison result, the control circuit 156c controls the switch circuit 157 so as to short-circuit and open the series circuit. For example, when the rotation speed of the rotor 151 is higher than the reference value, the switch circuit 157 is short-circuited, and electromagnetic braking force is applied to the rotor 151. When the rotation speed of the rotor 151 is lower than the reference value, the switch circuit 157 is opened, the electromagnetic braking force to be applied to the rotor is removed, and simultaneously, electric power is generated. By such control, the rotor, 151 is adjusted so as to constantly rotate at a substantially fixed speed. As a result, power to be transmitted from the driving source to the driven source is also transmitted at a fixed speed. Finally, the operating speed of the driven section is controlled. For example, in the case of an electronically controlled mechanical timepiece in which the driving source is a spring mechanism and the driven section is a pointer, the rotor 151 and the pointer are also controlled to rotate at a fixed speed.

FIG. 17 shows a modification of the above embodiment. This embodiments employs a power-generating device comprising a rotor 161, a stator yoke 162, a magnetic core 163, and a pair of electromagnetic coils 164 similar to those in the above, whereas the pair of electromagnetic coils 164 are not connected and serve different functions.

One of the electromagnetic coils 164 supplies electric power to a control section 166 similar to the above via a booster circuit 165 also functioning as a rectifier circuit similar to the above, and transmits a signal to a detection circuit 166a similar to the above so that the detection circuit 166 detects the rotation speed of the rotor 161. In contrast, a switch circuit 167 similar to the above is connected to both ends of the other electromagnetic coil 164. The switch circuit 167 short-circuits and disconnects both ends of the electromagnetic coil 164 in response to a control signal from a control circuit 166c similar to the above in the control section 166, and increases and decreases the electromagnetic braking force to be applied to the rotor 161 so as to control the rotation speed of the rotor 161.

While the stator in the above seventh embodiment shown in FIGS. 16 and 17 basically has a dipole structure, the number of poles of the rotor and the stator is not limited in the present invention. For example, a multipolar generator with a rotor and a stator having more than four poles also provides equivalent advantages.

The power-generating device of the present invention is not limited to the above embodiments, and it is to be understood that various modifications are possible within the spirit of the invention. The power-generating device of the present invention may be mounted not only in electronic timepieces (electronically driven (wrist)watches, electronically controlled mechanical timepieces), but also in various electronic devices, such as desktop calculators, pagers, portable telephones, and personal computers (in particular, portable information terminals). In particular, the application of the present invention to portable electronic devices provides pronounced advantages of permitting power supply by self power generation and contributing to reduction in size and weight of the portable devices.

Industrial Applicability

As described above, according to the present invention, since the first laminated member and the second laminated member are joined by the joint means while the opposing concave structures formed in the end portions thereof are mated in a staggered manner, the joint area therebetween is increased. Since the end faces of the magnetic materials are contacted with each other by joining the opposing concave structures in the end portions, magnetic resistance in the joint section is reduced, and efficient magnetic flux in the magnetic circuit is increased. Furthermore, the joint state is stabilized and assembly operation is facilitated by mating the opposing concave structures.

What is claimed is:

1. A magnetic circuit structure comprising:
   first and second laminated members each composed of a plurality of stacked magnetic materials; and
   joint means for holding an end portion of said first laminated member and an end portion of said second laminated member joined to each other, said first and second laminated members joined to each other constituting at least a part of a magnetic circuit,
   wherein said end portions of said first and second laminated members are provided with opposing concave structures, as viewed from a predetermined direction, so that said opposing concave structures have corresponding shapes, and are joined by said joint means in a state in which said opposing concave structures are mated in a staggered manner,
   wherein said opposing concave structures are each formed to appear semi-cylindrical, as viewed from both the layer-stacking direction and the planar direction of said magnetic materials in said first laminated member and said second laminated member, and are mated in a staggered manner in both the layer-stacking direction and the planar direction, and
   wherein said joint means is provided with a pressing member for pressing said end portions of said first laminated member and said second laminated member, with said opposing concave structures mated, in a direction such that said end portions approach each other.

2. A magnetic circuit structure according to claim 1, wherein said end portion of said first laminated member and said end portion of said second laminated portion have contact face portions which extend in the direction of mating thereof and are in contact with each other.

3. A magnetic circuit structure according to claim 1, wherein cylindrical openings are formed by the mating of said opposing concave structures on said stacked magnetic materials in said first laminated member and said second laminated member.

4. A magnetic circuit structure according to claim 1, wherein said joint means joins said first laminated member and said second laminated member by a fastening member that is passed through said end portions of said first laminated member and said second laminated member with said opposing concave structures mated with each other.

5. A magnetic circuit structure according to claim 4, wherein at least a portion of said fastening member to be passed through said end portions of said first laminated member and said second laminated member is made of a soft magnetic material.

6. A magnetic circuit structure according to claim 5, wherein said fastening member is composed of a tube inserted in said end portions of said first laminated member and said second laminated member and a joint screw screwed in said tube, and at least one of said tube and said joint screw is made of a soft magnetic material.

7. A magnetic circuit structure according to claim 1, wherein said pressing member is placed outside a joint section between said first laminated member and said second laminated member.

8. A magnetic circuit structure according to claim 7, wherein said pressing member is placed so as to be in contact with a side face portion of at least one of said first laminated member and said second laminated member opposite from said end portion and so as to move in a predetermined direction, at least one of said side face portion and said pressing member is provided with an inclined face which is in contact with the other and is inclined in the predetermined direction, and said end portions of said first laminated member and said second laminated member are pressed in such a direction as to approach along said inclined face by moving said pressing member in the predetermined direction.

9. A magnetic circuit structure according to claim 1, wherein said pressing member is a fastening member placed inside a joint section between said first laminated member and said second laminated member so as to fasten said first laminated member and said second laminated member, and said first laminated member and said second laminated member are pressed in such a direction as to approach by fastening said fastening member.

10. A power-generating device having a magnetic circuit structure and a power-generating section,
    wherein said magnetic circuit structure includes:
       first and second laminated members each composed of a plurality of stacked magnetic materials; and
       joint means for holding an end portion of said first laminated member and an end portion of said second laminated member joined to each other, said first and second laminated members joined to each other constituting at least a part of a magnetic circuit,
       wherein said end portions of said first and second laminated members are provided with opposing concave structures, as viewed from a predetermined direction, so that said opposing concave structures have corresponding shapes, and are joined by said joint means in a state in which said opposing concave structures are mated in a staggered manner, wherein said opposing concave structures are each formed to appear semi-cylindrical, as viewed from both the layer-stacking direction and the planar direction of said magnetic materials in said first laminated member and said second laminated member, and are mated in a staggered manner in both the layer-stacking direction and the planar direction; and wherein said power-generating section comprises:
a rotatable rotor having a rotor magnetic pole;
a stator yoke having a stator magnetic pole opposing said rotor magnetic pole; and
a stator having a magnetic core magnetically connected to said stator yoke and an electromagnetic coil wound on said magnetic core, and
wherein said magnetic circuit structure is applied to said stator.

11. A power-generating device according to claim 10, wherein said stator yoke and said magnetic core are said first laminated member and said second laminated member, respectively.

12. An electric timepiece having a power-generating device claimed in claim 10.

13. An electronic device having a power-generating device claimed in claim 10.

14. An electronic device according to claim 13, wherein an oscillating weight having a biased weight distribution is provided rotatably on the center of rotation and is connected to said rotor.

15. An electronic device according to claim 13, further comprising:
detection means for detecting the state of rotation of said rotor based on electromotive force generated by said electromagnetic coil; and
rotation control means for magnetically controlling the state of rotation of said rotor via said stator according to a detection value of said detection means.

16. An electronic device according to claim 13, further comprising:
energy generating means for generating mechanical energy;
a gear train for transmitting the mechanical energy;
a pointer to be driven by said gear train;
said power-generating device to be driven by said gear train;
reference signal generating means for generating a reference signal; and
rotation control means for comparing a rotation signal having a cycle corresponding to the rotation cycle of said rotor in said power-generating device with the reference signal and outputting a rotation control signal for said rotor to said power-generating device according to the result of the comparison so as to exert electromagnetic braking force on said rotor,
wherein at least said reference signal generating means and said rotation control means are driven by electromotive force of said power-generating device.

17. A magnetic circuit structure comprising:
a first laminated member composed of a plurality of stacked layers of magnetic material, said first laminated member having a first prong on a first stacked layer, said first prong defined by an extension of said first stacked layer beyond a base of a second stacked layer adjacent said first stacked layer;
a second laminated member composed of a plurality of stacked layers of magnetic material, said second laminated member having a second wrong on a third stacked layer, said second prong defined by an extension of said third stacked layer beyond a base of a fourth stacked layer adjacent said third stacked layer;
said first and second laminated members being mated together such that said first prong of said first stacked layer aligns with said base of said fourth stacked layer in a coplanar arrangement and said second prong of said third stacked layer aligns with said base of said second stacked layer in a coplanar arrangement, said first and second prongs being overlapped in a vertical direction orthogonal to said coplanar arrangement; and
a fastener for adjoining said first laminated member to said second laminated member such that said first stacked layer makes pressure contact coplanar to said fourth stacked layer and said third stacked layer makes pressure contact coplanar to said second stacked layer;
wherein said fastener is one of a first fastener in said first laminated member and a second fastener in said second laminated member, said first and second fasters being at opposite ends of said overlapped first and second prongs, at least one of said first and second fasteners including a pressing member for pressing its respective laminated member toward the opposite fastener, said pressing member being in contact with a hole face of at least one stacked layer of its respective laminated member, said hole face having at least one wall section upwardly inclined toward said opposing fastener, said pressing member having at least one section downwardly inclined for mating with said upwardly inclined wall section and wedging said at least one stacked layer toward said opposing fastener.

18. The structure of claim 17 wherein said at least one fastener including said pressing member further includes a screw for pressing said pressing member against said hole wall, at least one of said screw and pressing member being made of a soft magnetic material.

19. A magnetic circuit structure comprising:
a first laminated member composed of a plurality of stacked layers of magnetic material, said first laminated member having a first prong on a first stacked layer, said first prong defined by an extension of said first stacked layer beyond a base of a second stacked layer adjacent said first stacked layer;
a second laminated member composed of a plurality of stacked layers of magnetic material, said second laminated member having a second prong on a third stacked layer, said second prong defined by an extension of said third stacked layer beyond a base of a fourth stacked layer adjacent said third stacked layer;
said first and second laminated members being mated together such that said first prong of said first stacked layer aligns with said base of said fourth stacked layer in a coplanar arrangement and said second prong of said third stacked layer aligns with said base of said second stacked layer in a coplanar arrangement, said first and second prongs being overlapped in a vertical direction orthogonal to said coplanar arrangement; and
a fastener for adjoining said first laminated member to said second laminated member such that said first stacked layer makes pressure contact coplanar to said fourth stacked layer and said third stacked layer makes pressure contact coplanar to said second stacked layer;
wherein said first laminated member further includes a third prong on said second stacked layer, said third prong defined by an extension of said second stacked layer beyond a base of said first stacked layer; and said second laminated member further including a fourth prong on said fourth stacked layer, said fourth prong defined by an extension of said fourth stacked layer beyond a base of said third stacked layer;

said first prong being offset from said third prong in said vertical direction and said second prong being offset from said fourth prong in said vertical direction;

wherein said third prong of said second stacked layer aligns with said base of said third stacked layer in a coplanar arrangement and said fourth prong of said fourth stacked layer aligns with said base of said first stacked layer in a coplanar arrangement;

wherein said first laminated member has a first concave opening in said first and second stacked layers between said first and third prongs and said second laminated member has a second concave opening in said third and fourth stacked layers between said second and fourth prongs, said first concave opening being arranged opposite said second concave opening to form a composite circular opening, said fastener being inserted in said circular opening.

20. The structure of claim 19 wherein said fastener is made of a magnetic material.

21. The structure of claim 19 wherein said fastener includes a tube in said circular opening and a screw in said tube, at least one of said tube and a screw being made of a soft magnetic material.

22. A magnetic circuit structure comprising:
a first laminated member composed of a plurality of stacked layers of magnetic material, said first laminated member having a first prong on a first stacked layer, said first prong defined by an extension of said first stacked layer beyond a base of a second stacked layer adjacent said first stacked layer:

a second laminated member composed of a plurality of stacked layers of magnetic material, said second laminated member having a second prong on a third stacked layer, said second prong defined by an extension of said third stacked layer beyond a base of a fourth stacked layer adjacent said third stacked layer;

said first and second laminated members being mated together such that said first prong of said first stacked layer aligns with said base of said fourth stacked layer in a coplanar arrangement and said second prong of said third stacked layer aligns with said base of said second stacked layer in a coplanar arrangement, said first and second prongs being overlapped in a vertical direction orthogonal to said coplanar arrangement; and a fastener for adjoining said first laminated member to said second laminated member such that said first stacked layer makes pressure contact coplanar to said fourth stacked layer and said third stacked layer makes pressure contact coplanar to said second stacked layer;

wherein said first laminated member further includes a third prong on said second stacked layer, said third prong defined by an extension of said second stacked layer beyond a base of said first stacked layer; and said second laminated member further including a fourth prong on said fourth stacked layer, said fourth prong defined by an extension of said fourth stacked layer beyond a base of said third stacked layer;

said first prong being offset from said third prong in said vertical direction and said second prong being offset from said fourth prong in said vertical direction;

wherein said third prong of said second stacked layer aligns with said base of said third stacked layer in a coplanar arrangement and said fourth prong of said fourth stacked layer aligns with said base of said first stacked layer in a coplanar arrangement;

wherein said fastener is located entirely within said first and second prongs.

23. The structure of claim 22 wherein said fastener includes a tube in said first and second prongs and a screw in said tube, at least one of said tube and a screw being made of a soft magnetic material.

24. A magnetic circuit structure comprising:
a first laminated member composed of a plurality of stacked layers of magnetic material, said first laminated member having a first prong on a first stacked layer, said first prong defined by an extension of said first stacked layer beyond a base of a second stacked layer adjacent said first stacked layer;

a second laminated member composed of a plurality of stacked layers of magnetic material, said second laminated member having a second prong on a third stacked layer, said second prong defined by an extension of said third stacked layer beyond a base of a fourth stacked layer adjacent said third stacked layer;

said first and second laminated members being mated together such that said first prong of said first stacked layer aligns with said base of said fourth stacked layer in a coplanar arrangement and said second prong of said third stacked layer aligns with said base of said second stacked layer in a coplanar arrangement, said first and second prongs being overlapped in a vertical direction orthogonal to said coplanar arrangement; and a fastener for adjoining said first laminated member to said second laminated member such that said first stacked layer makes pressure contact coplanar to said fourth stacked layer and said third stacked layer makes pressure contact coplanar to said second stacked layer;

wherein said first laminated member further includes a third prong on said second stacked layer, said third prong defined by an extension of said second stacked layer beyond a base of said first stacked layer; and said second laminated member further including a fourth prong on said fourth stacked layer, said fourth prong defined by an extension of said fourth stacked layer beyond a base of said third stacked layer;

said first prong being offset from said third prong in said vertical direction and said second prong being offset from said fourth prong in said vertical direction;

wherein said third prong of said second stacked layer aligns with said base of said third stacked layer in a coplanar arrangement and said fourth prong of said fourth stacked layer aligns with said base of said first stacked layer in a coplanar arrangement;

wherein first prong has a first concave opening facing said third prong, said second prong has a second concave opening facing said fourth prong, said third prong has a third concave opening facing said first prong, and said fourth prong has fourth concave opening facing said second prong;

said fourth prong adjoining said first prong with said fourth concave opening arranged opposite said first concave opening to form a first circular opening;

said third prong adjoining said second prong with said third concave opening arranged opposite said second concave opening to form a second circular opening;

said first and second circular openings being overlapped, and said fastener being inserted in the overlap region of said first and second circular openings.

25. The structure of claim 24 wherein said first circular opening is concentric with said second circular opening.

26. The structure of claim 24 wherein said fastener is made of a magnetic material.

27. The structure of claim 24 wherein said fastener includes a tube in said overlap region and a screw in said tube, at least one of said tube and a screw being made of a soft magnetic material.

28. The structure of claim 24 wherein said prongs have one of a rectangular and triangular shape.

* * * * *

UNITED STATES PATENT AND TRADEMARK OFFICE
CERTIFICATE OF CORRECTION

PATENT NO. : 6,800,983 B1
DATED : October 5, 2004
INVENTOR(S) : Yoshitaka Iijima et al.

It is certified that error appears in the above-identified patent and that said Letters Patent is hereby corrected as shown below:

Column 20,
Line 1, please change "wrong" to -- prong --.

Signed and Sealed this

Twenty-second Day of March, 2005

JON W. DUDAS
*Director of the United States Patent and Trademark Office*